(12) United States Patent
Greco

(10) Patent No.: US 12,017,905 B2
(45) Date of Patent: Jun. 25, 2024

(54) APPARATUS FOR PREPARING AND DISPENSING A LUBRICATING AND COOLING LIQUID PRODUCT FOR MACHINE TOOLS

(71) Applicant: Luca Greco, Abbadia Lariana (IT)

(72) Inventor: Luca Greco, Abbadia Lariana (IT)

(*) Notice: Subject to any disclaimer, the term of this patent is extended or adjusted under 35 U.S.C. 154(b) by 369 days.

(21) Appl. No.: 17/593,806

(22) PCT Filed: Mar. 26, 2020

(86) PCT No.: PCT/IB2020/052864
§ 371 (c)(1),
(2) Date: Sep. 24, 2021

(87) PCT Pub. No.: WO2020/194231
PCT Pub. Date: Oct. 1, 2020

(65) Prior Publication Data
US 2022/0048755 A1 Feb. 17, 2022

(30) Foreign Application Priority Data

Mar. 27, 2019 (IT) .................... 102019000004619

(51) Int. Cl.
*B67D 7/74* (2010.01)
*B01F 23/451* (2022.01)
(Continued)

(52) U.S. Cl.
CPC ............ *B67D 7/743* (2013.01); *B01F 23/451* (2022.01); *B01F 25/312* (2022.01);
(Continued)

(58) Field of Classification Search
CPC . B67D 7/743; B67D 7/04; B67D 7/36; B67D 7/62; B67D 7/70; B67D 7/78;
(Continued)

(56) References Cited

U.S. PATENT DOCUMENTS 2,381,650 A * 8/1945 Dick .................... F04B 23/021
408/61
4,487,340 A * 12/1984 Shaffer .............. B23Q 11/1084
417/259
(Continued)

FOREIGN PATENT DOCUMENTS

DE  10 2016 005346    11/2016
GB     2 239 002      6/1991
(Continued)

OTHER PUBLICATIONS

International Search Report for PCT/IB2020/052864, dated Jul. 3, 2020, 5 pages.
Written Opinion of the ISA for PCT/IB2020/052864, dated Jul. 3, 2020, 6 pages.

*Primary Examiner* — Paul R Durand
*Assistant Examiner* — Michael J. Melaragno
(74) *Attorney, Agent, or Firm* — NIXON & VANDERHYE

(57) ABSTRACT

Disclosed is an apparatus for preparing and dispensing a lubricant and coolant liquid product including a body with a base that defines a support surface for at least one container of an additive product and having a collection tank above which the container can be positioned, a storage reservoir of water suppliable from a water source, a mixing unit in communication with the reservoir and with the at least one container of the additive product, to mix the water and the additive product in a predetermined concentration, first pumping means adapted to pump the water from the reservoir toward the mixing unit, a control unit to control at least the first pumping means, and a dispensing circuit for dispensing the lubricant and coolant fluid obtained in the mixing unit. The body further includes a containing structure that encloses one, several or all the aforesaid components.

20 Claims, 5 Drawing Sheets

(51) Int. Cl.
*B01F 25/312* (2022.01)
*B01F 35/21* (2022.01)
*B01F 35/221* (2022.01)
*B01F 101/39* (2022.01)
*B23Q 11/10* (2006.01)
*B67D 7/04* (2010.01)
*B67D 7/36* (2010.01)
*B67D 7/62* (2010.01)
*B67D 7/70* (2010.01)
*B67D 7/78* (2010.01)
*B67D 7/84* (2010.01)

(52) U.S. Cl.
CPC ...... *B01F 35/2111* (2022.01); *B01F 35/2132* (2022.01); *B01F 35/2217* (2022.01); *B23Q 11/10* (2013.01); *B67D 7/04* (2013.01); *B67D 7/36* (2013.01); *B67D 7/62* (2013.01); *B67D 7/70* (2013.01); *B67D 7/78* (2013.01); *B67D 7/84* (2013.01); *B01F 2101/39* (2022.01)

(58) Field of Classification Search
CPC ...... B67D 7/84; B01F 25/312; B01F 35/2111; B01F 23/451; B01F 35/2132; B01F 35/2217; B01F 2101/39; B23Q 11/10
USPC ........................................................ 222/61
See application file for complete search history.

(56) References Cited

U.S. PATENT DOCUMENTS

| | | | | |
|---|---|---|---|---|
| 4,514,149 | A * | 4/1985 | Kanebako | B23Q 11/10 91/40 |
| 4,597,697 | A * | 7/1986 | Shaffer | B23Q 11/1038 408/61 |
| 4,664,565 | A * | 5/1987 | Palm | B23Q 9/0014 408/710 |
| 4,976,546 | A * | 12/1990 | Beattie | B01F 23/49 366/162.3 |
| 5,147,161 | A * | 9/1992 | Whiting | B23Q 11/10 408/61 |
| 7,284,898 | B2 * | 10/2007 | Duell | B01F 35/82 366/136 |
| 11,313,514 | B2 * | 4/2022 | Mathison | F17C 5/06 |
| 2014/0271002 | A1 * | 9/2014 | Hoshino | B23Q 11/10 408/56 |
| 2016/0070274 | A1 | 3/2016 | Haas et al. | |
| 2018/0272489 | A1 | 9/2018 | Hudkins et al. | |
| 2022/0048755 | A1 * | 2/2022 | Greco | B01F 35/2111 |

FOREIGN PATENT DOCUMENTS

WO 2012/063184 5/2012
WO WO-2020194231 A1 * 10/2020 ........ B01F 15/00136

* cited by examiner

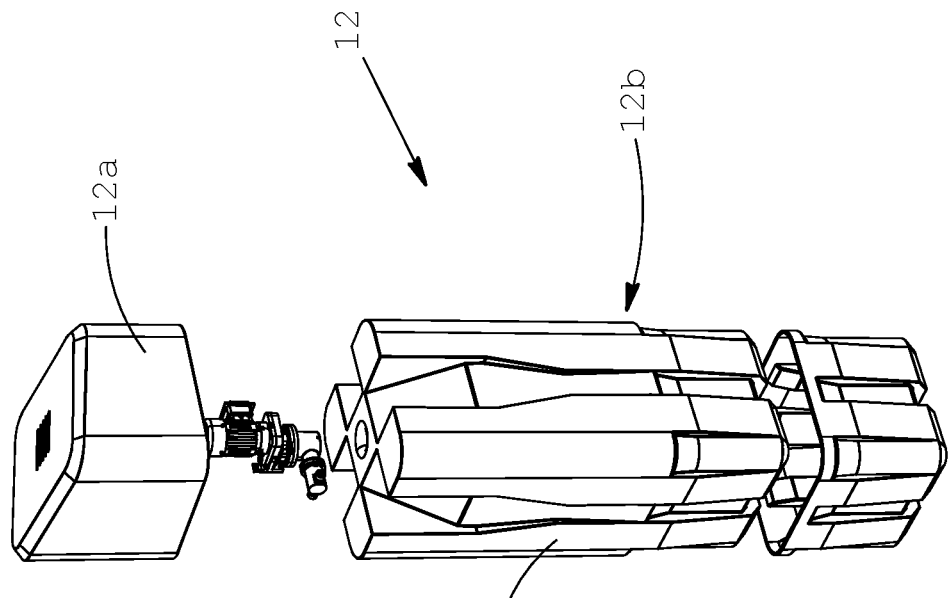
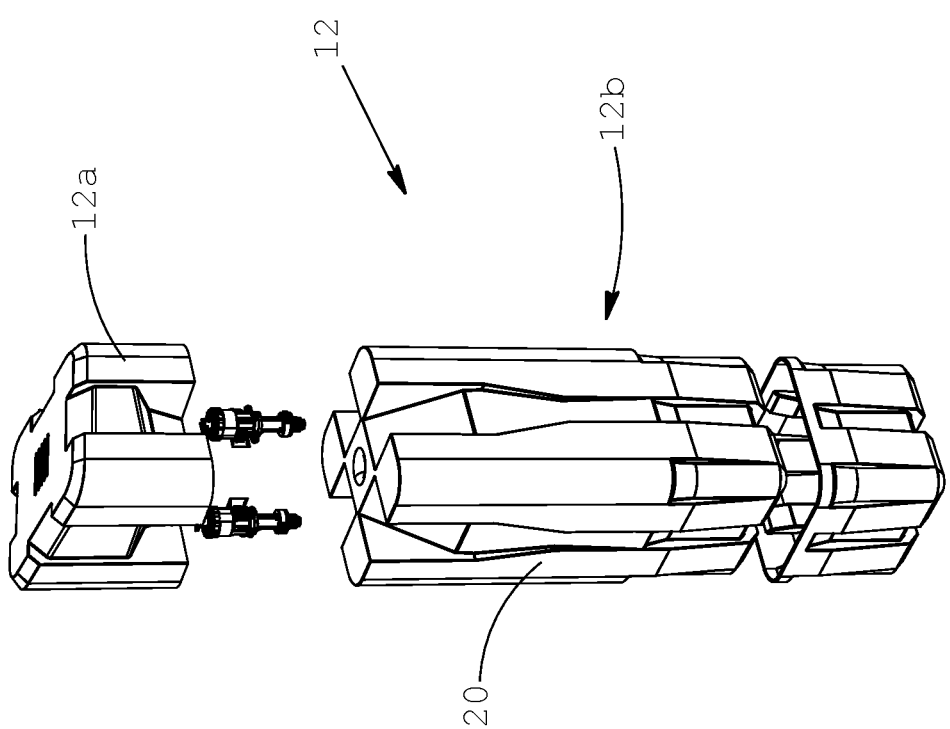

APPARATUS FOR PREPARING AND DISPENSING A LUBRICATING AND COOLING LIQUID PRODUCT FOR MACHINE TOOLS

This application is the U.S. national phase of International Application No. PCT/IB2020/052864 filed 26 Mar. 2020, which designated the U.S. and claims priority to IT Patent Application No. 102019000004619 filed 27 Mar. 2019, the entire contents of each of which are hereby incorporated by reference.

BACKGROUND OF THE INVENTION

Field of the Invention

The present invention relates to an apparatus for preparing and dispensing a liquid product comprising two or more mixed liquids, in particular in the form of emulsion, of the type used to lubricate and cool workpieces and tools in machine tools.

Description of the Related Art

As is known, cutting machine tools, in particular those for machining metals, are equipped with a device for sprinkling the area of contact between tool and workpiece with a specific liquid product; this operation is carried out with the aim both of limiting the increase in the temperature of the two parts and of lubricating the mutually moving surfaces. Typically, the product used for this purpose comprises water and lubricant oil (typically in a percentage ranging from around 2% to 15%) mixed in an emulsion known in the field as cutting fluid. Hereunder, for brevity the term "product" or "liquid product" shall refer to a cutting fluid of this type comprising at least water and at least one liquid additive product mixed together.

In general, machine tools comprise a storage reservoir from which said liquid product is picked up and dispensed on the machining tools and to which a part of the product recovered after falling from the operating areas is conveyed back.

As a fraction of the product dispensed (especially the aqueous fraction) evaporates in contact with the tool or workpiece or is removed together with the chips, the level in the reservoir gradually drops and, therefore, it must be periodically topped up.

A device widely used for preparing a cutting fluid comprises a mechanical volumetric dosing device with a first inlet to be connected to a pressurized water source, for example from the water supply network, and a second inlet to be placed in communication with a reservoir or a drum containing lubricant oil or other suitable additives.

An example of a mixing/dosing device of this type is marketed by Dosatron International with the trademark DOSATRON® and is described in WO 2012/063184 A1.

Although this device is simple and inexpensive, it nonetheless has some limits.

Firstly, regulation of the concentration of oil in the emulsion can undergo variations, even significant, when the flow rate of water from the water supply network varies. Therefore, after regulating the device to obtain an emulsion with a given nominal concentration of oil, the actual concentration can nonetheless differ in the event of a temporary drop in the flow rate, for example due to peak demands from various users in the vicinity.

Moreover, this device does not provide for control of the effective concentration of the product obtained and hence a possible subsequent correction. The emulsion, in the correct or incorrect concentration, is therefore used as is in the machine tool with potential risk of damage to the tools or of machining defects.

Moreover, regulation of the concentration is carried out by means of a manual control of ring nut type. As the correct concentration of the oil in the emulsion can vary as a function of the type of machine tool, of the material of the workpiece machined or of other parameters, each time a variation in the concentration of the emulsion is required, the aforesaid manual control must be used, increasing the risk of errors by inexperienced or distracted operators.

Another limit of this known device is the fact that the maximum flow rate delivered by the dosing device is linked to the maximum flow rate of the water supply network to which it is connected. When it is necessary to top up reservoirs of large machine tools, the operation can take some time, keeping the device occupied and unavailable to supply other machines served by the same preparation point.

Finally, this known device substantially consists of a drum body with a dip pipe to insert into the mouth of a drum/container of lubricant oil. When the drum/container is empty the dosing device is removed therefrom and inserted into a new drum. Often, in the environment in which a certain number of machine tools are installed, the full or empty drums are stored in the preparation area of the emulsion, without particular precautions from the point of view of safety.

SUMMARY OF THE INVENTION

In this context, an object of the present invention is to provide an apparatus for preparing and dispensing a cutting fluid product for machine tools or the like that allows the operations for preparation and collection of the liquid product to be carried out in a rapid, practical and safe manner.

Another object of the present invention is to provide an apparatus that allows precise regulation and control of the amounts of the various products mixed to form this product.

Another object of the present invention is to produce a device that can dispense a high flow rate of product or in any case higher than the water supply network flow rate, to reduce the times required for filling and topping up the machine tools.

Another object of the present invention is to provide an apparatus that allows automation of the aforesaid filling and top-up operations of the cutting fluid product in machine tools.

A further object of the present invention is to produce a modular apparatus that can be configured in several variants as a function of the user's needs.

These and other objects are achieved with an apparatus for preparing and dispensing a lubricant and coolant liquid product, comprising a mixture of water and at least one additive product, in conformity with one or more of the appended claims.

According to the invention, the apparatus comprises a body with a base that defines a support surface adapted to accommodate at least one container of an additive product used to prepare the lubricant and coolant product and a containing structure that encloses the aforesaid components of the apparatus.

The apparatus thus produced allows the creation, in an environment in which machine tools are installed, of a well-delimited production area of the lubricant and coolant liquid product (hereinafter also simply product or end products) where the containers of the additive products, in general oil or similar, are stored in a safe and orderly manner.

Moreover, the containing structure allows the various components of the apparatus to be grouped together in an orderly fashion, making them accessible only to authorized personnel.

According to an aspect of the invention, the base comprises at least one collection tank above which said container can be positioned. Preferably, the support surface of the containers comprises a grating or the like that allows liquids that are accidentally spilled to be confined in the collection tank below, leaving the area surrounding the apparatus clean and consequently safer for operators passing through it.

According to the invention, the apparatus comprises at least the following components:
- a storage reservoir of water suppliable from a water source;
- a mixing unit, in communication with said reservoir and with the at least one container of the additive product, configured to mix the water and the additive product in a predetermined concentration; and
- first pumping means adapted to pump the water from the reservoir toward the mixing unit.

The storage reservoir provides a supply of water that can be pumped into the mixing unit to prepare the end product. The use of this supply and of the pumping means allows a higher flow rate of the product relative to the normal flow rate of the water supply network and, consequently, top-up or filling operations with said liquid can be carried out in less time.

According to the invention, the apparatus further comprises a control unit that controls at least the first pumping means and, in some variants of the invention, also the mixing unit.

The control unit is typically connected to a user interface that allows an operator to control the apparatus and manage some operating parameters, such as the amount of cutting fluid product to be prepared and the concentration of the additive product. Said interface can, for example, comprise a touch screen that allows the operator both to view and to set the operating parameters of the apparatus.

The cutting fluid product prepared can be dispensed by the apparatus through a dispensing circuit. Said dispensing circuit can, for example, comprise a cock or similar device, positioned close to the apparatus, to manually collect small amounts of product.

According to a preferred variant, said dispensing circuit can also, or alternatively, comprise one or more pipes for conveying the end product directly to the machine tools, in particular into the reservoirs with which they are usually provided.

According to an aspect of the invention, a flow meter connected to the control unit is installed on the pipe that conveys the water to the mixing unit, for example downstream of the first pumping means. Preferably, said flow meter can also perform the function of liter counter to measure the volume of product dispensed by the pumping means.

According to a variant of the invention, the mixing unit comprises second pumping means adapted to collect the additive product from the container and to send it toward a mixing area, for example a mixing chamber, where the water and the additive product are mixed, typically forming an emulsion.

Said second pumping means are generally also associated with a flow meter, if necessary with liter counter function, and are both connected to the control unit.

According to this variant, the desired concentration of the additive product in the end product is obtained by suitably regulating the flow rate of the respective liquids, i.e., water and additive product, pumped by the first and by the second pumping means by means of the control unit.

To this end, the flow rate of the first or the second pumping means, or both, can be regulated. According to a preferred embodiment said pumping means are equipped with a motor provided with or coupled to a speed controller, for example an inverter or similar devices. Alternatively, to vary the flow rate the apparatus can comprise automatic regulating valves.

After setting the desired concentration, the control unit activates the first and the second pumping means regulating the respective flow rates to obtain an end product with the aforesaid selected concentration at the outlet of the mixing unit.

According to an alternative variant, the mixing unit comprises at least one mixing/dosing device of volumetric or Venturi effect type. Said mixing/dosing device can, for example be like the one described in WO 2012/063184 A1 or other similar devices. According to this variant, the apparatus preferably comprises two or more of these mixing/dosing devices. The various mixing/dosing devices can be placed in communication with the same container of additive product or each with a dedicated container, where more than one is provided on the apparatus.

Said mixing/dosing devices can be of fixed or non-adjustable type or, preferably, of adjustable type, to vary the concentration of the additive product.

In the apparatus of the invention said mixing/dosing devices are selected or are regulated so as to each supply a cutting fluid product with a different concentration of additive product.

Preferably, the water inlet of each mixing/dosing device is provided with a valve, controlled by the control unit, adapted to control, and more precisely to allow or exclude, the passage of water into the mixing/dosing device. In this way, the control unit, by controlling the aforesaid valves, can operate only one of the mixing/dosing devices that supplies the end product with the predetermined concentration of additive product, excluding the others.

Also according to this variant, at least downstream of the first pumping means or downstream of the mixing/dosing devices, the apparatus is preferably equipped with one or more flowmeters or liter counters or combined devices.

The apparatus thus configured is able to prepare a given volume of end product even with a concentration of additive product different from those preset in the various mixing/dosing devices. In fact, once the total volume of product to be prepared and the desired concentration are known, the control unit is able to calculate the various amounts of product at different concentrations that must be dispensed by each mixing/dosing device to obtained a total volume of end product whose average concentration is equivalent to the chosen one. To do so, the control unit reads the data collected by the flow meters/liter counter and controls the various valves to activate and deactivate them in a predetermined sequence.

According to an aspect of the invention, the apparatus can comprise a sensor for measuring the concentration of the at least one additive in the cutting fluid product delivered from the mixing unit. Said sensor is positioned downstream of the mixing unit and is connected to the control unit.

The data on the concentration can be used only to verify the correct operation of the apparatus, and in particular of the mixing unit, or to control the mixing unit in feedback and correct the effective value of the concentration in real time when this differs from the nominal or expected value.

Said correction can be implemented in a particularly effective way in the first variant described, regulating by means of the control unit the flow rate of the first or of the second pumping means or of both.

With reference to the variants illustrated above, one, more than one or all the aforementioned components chosen from meters, sensors, valves, etc. are enclosed in the containing structure.

In this way the operator can control the apparatus only through the user interface positioned in an easily accessible point.

According to another aspect of the invention, in the variant in which the apparatus can supply one or more machine tools directly by means of respective supply pipes, the apparatus can also comprise, for each machine tool served, a sensor for measuring the level of the lubricant and coolant product in the reservoir of the machine and a sensor for measuring the concentration of the additive dispersed in the water. Said sensors are both preferably connected to the control unit, which, according to an aspect of the invention, is configured to calculate the amount and correct concentration of the end product necessary to take the concentration of the product in the reservoir of the machine tool to a predetermined concentration.

Advantageously, the control unit is programmable to automatically activate the apparatus when the level in the reservoir of the machine has dropped below a predetermined threshold or when the concentration of the product in the reservoir differs greatly from the optimal value, for example due to evaporation of the aqueous fraction.

According to an aspect of the invention, the containing structure can be integral with the base or, preferably, separate and couplable thereto.

For example, according to this last variant, the containing structure can be placed on the support surface of the base, on the bottom of the collection tank or, alternatively, can be placed side by side with the latter.

In this way, it is possible to provide the apparatus with a base of different dimensions, which can accommodate a number of drums of additive desired by the user.

According to a variant of the invention, the base can comprise two or more collection tanks arranged side by side, and made integral, so as to define a single support surface for the drums or containers of the desired shape and size.

According to another aspect of the invention, the body of the containing structure also acts as water storage reservoir. According to this variant, the containing structure comprises a lower body that forms the storage reservoir, or in which the storage reservoir is obtained, and an upper body that encloses the other components of the mixing and distribution apparatus, for example the mixing unit, the first and/or second pumping means, and the control unit.

The lower body and the upper body can be joined by coupling. This configuration makes it possible to arrange the apparatus in different functional configurations, if necessary changing only the upper body of the containing structure.

It is specified that the apparatus of the present invention, although designed for the machine tool and metalworking industrial sector, can also be advantageously used in other industrial sectors, for example to prepare other liquid substances to be mixed and dosed such as emulsifiable oils, detergent or degreasing chemical products, or to prepare and dispense disinfectant, sanitizing or sterilizing substances, detergents and, more generally, substances in which one or more additive products must be added to a base substance, water or the like.

BRIEF DESCRIPTION OF THE DRAWINGS

Other features and advantages of the invention will be apparent from the following detailed description of non-limiting embodiments of the invention, with reference to the accompanying figures, wherein:

FIGS. 4*a* and 4*b* are exploded perspective views of the containing structure according to two variants of the invention;

DESCRIPTION OF THE PREFERRED EMBODIMENTS

Figure 1:
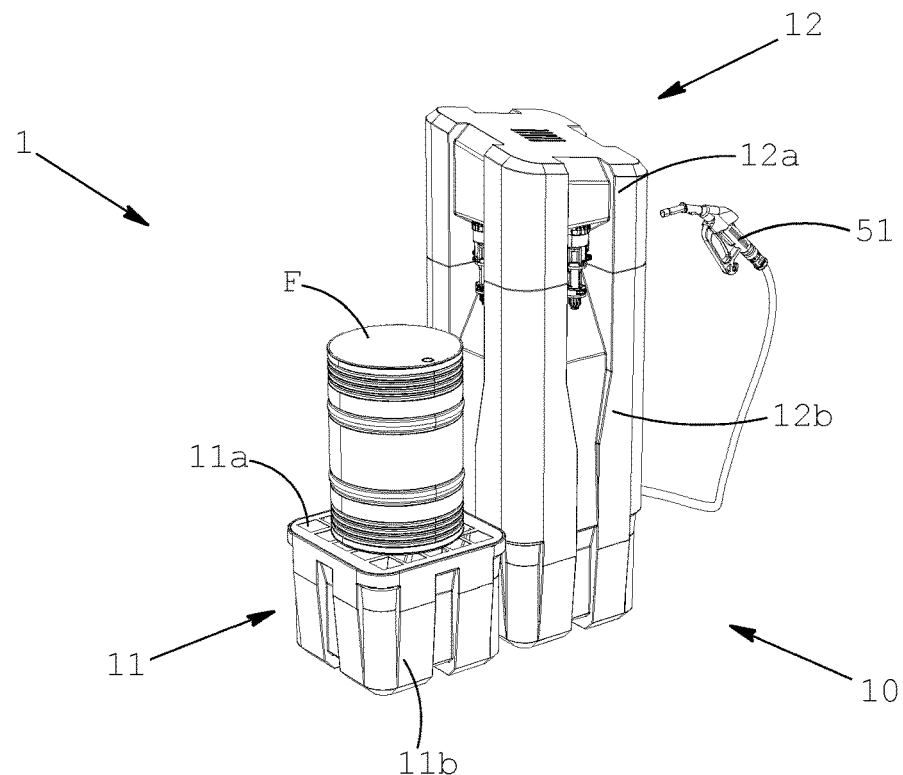
FIGS. 1, 2, 3*a* and 3*b* represent perspective views of the apparatus according to the present invention.

With reference to FIGS. 1, 2, 3*a* and 3*b*, the number 1 indicates as a whole the apparatus according to the invention.

The apparatus 1 comprises a body 10 with a base 11 and a containing structure 12. The base 11 has a support structure 11*a* on which the drums F (as in FIG. 2) or a container C (as in FIG. 1), containing an additive product to be mixed to the water to obtain a cutting fluid product, can be positioned. This additive product is typically an emulsifiable oil.

The support surface 11*a* preferably consists at least partly of a grate that allows the liquid, which can accidentally spill during the operations to store or remove the drums or containers, to flow into a collection tank 11*b* below.

According to a preferred variant, illustrated in the figures, the base substantially consists of the collection tank 11*b*.

According to a preferred variant, the containing structure 12 comprises a lower body 12*a*, which forms the storage reservoir of the water used to produce the cutting fluid, and an upper body 12*b*, mounted on the lower body 12*a*, which encloses the other components of the apparatus. The upper and lower bodies are releasably coupled so that different upper bodies 12*b* can be mounted on the same lower body 12*a* (reservoir) as a function of the configuration of the plant of the apparatus and thus of the components present within it, as illustrated in FIGS. 4*a* and 4*b*.

According to a preferred embodiment, the containing structure 12 is separate from the base 11 and couplable thereto, for example with interlocking connection means, hooks or the like, or simply placed thereon.

Figure 2:
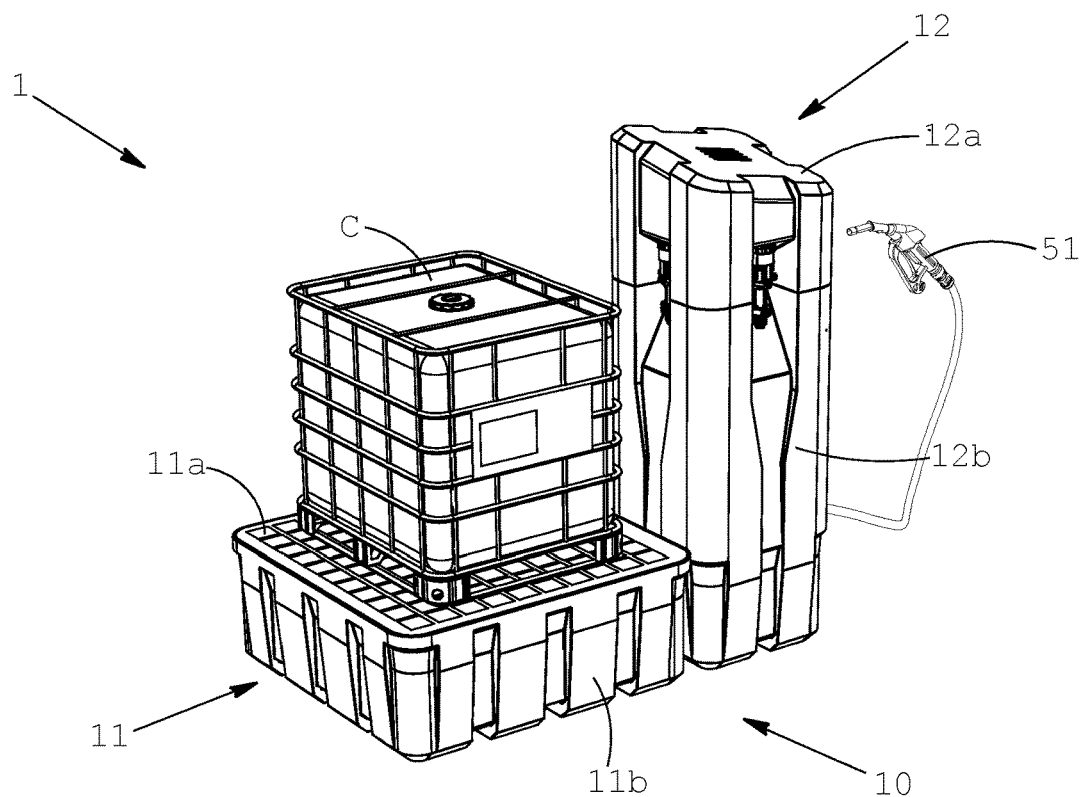
Figure 3A:
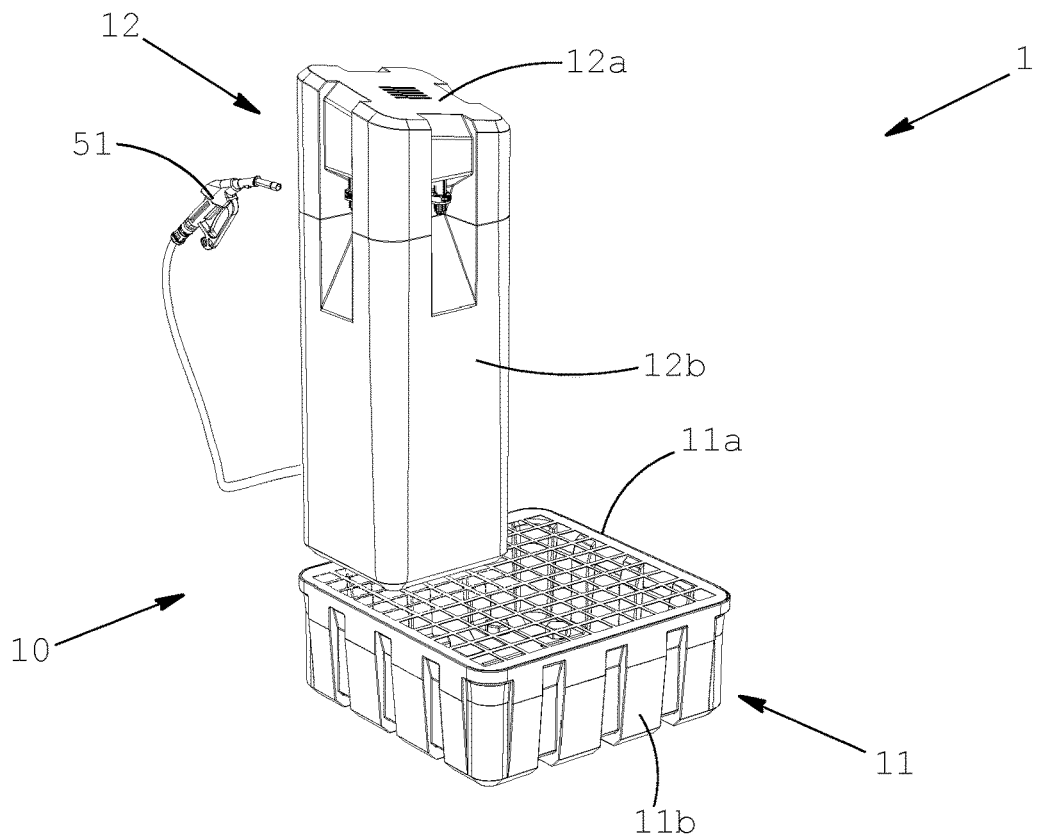
Figure 3B:
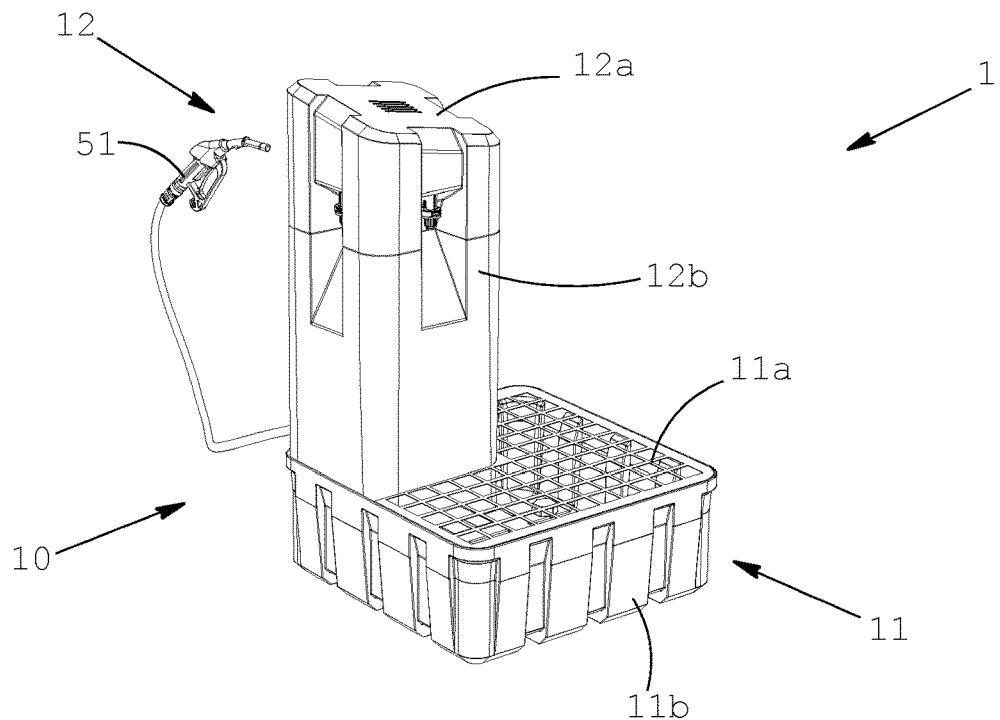

Said containing structure 12 can be arranged side by side with the base 11, or with the collection tank 11*b*, as shown in FIGS. 1 and 2, placed on the support surface 11*a*, as shown in the example of FIG. 3*a*, or placed on the bottom of the collection tank 11*b*, as shown in the example of FIG. 3*b*.

According to another variant of the invention, the containing structure 12 comprises at least one box-shaped element, such as a casing, adapted to enclose the components of the apparatus described in detail hereunder. Said containing structure is preferably integral with the base 11 and is arranged at least at one of its sides.

It is specified that the shape and the dimensions of the containing structure 12 are illustrated by way of example and that it can be designed with different shapes according to the layout, dimensions and shape of the various internal components.

The upper 12a and lower 12b body of the containing structure 12 and the base 11, or at least of the collection tank 12b, are preferably made of a polymer material and are typically produce by molding.

Figure 5:
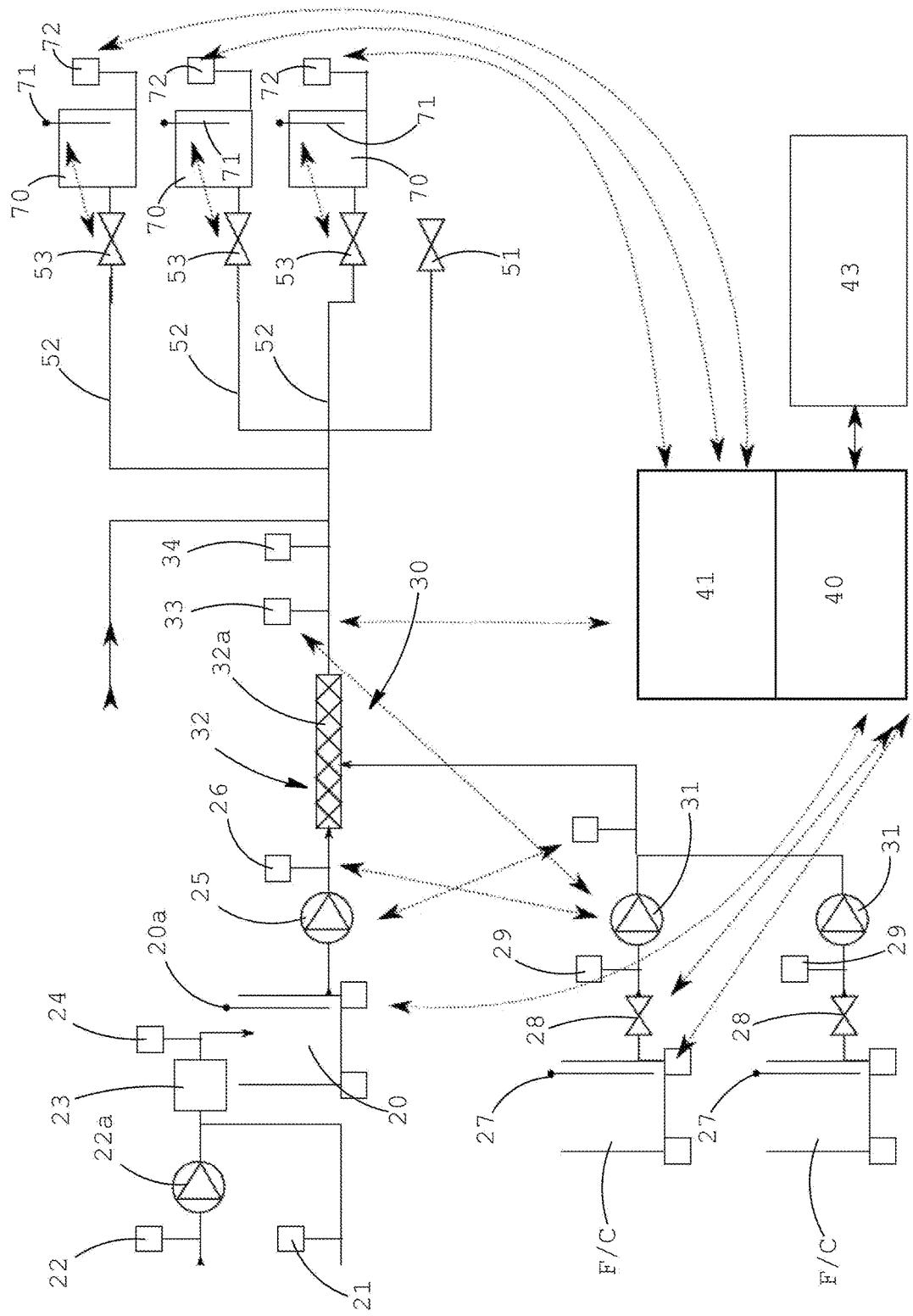
FIG. 5 is a schematic representation of the components of the apparatus according to a variant of the invention.

FIG. 5 schematically represents the various components of the apparatus according to an embodiment of the invention.

The apparatus comprises a reservoir 20 adapted to contain a supply of water for preparing the cutting fluid product. The capacity of the reservoir depends on the number and on the dimensions of the machine tools served by the apparatus. Typically, the capacity ranges from around 100 to 1000 liters. Its shape can also vary as a function of the dimensions and of the external shape to be given to the containing structure 12.

The reservoir 20 can be connected to the water supply network 21 or to a well 22 by means of a pump 22a. If necessary, the water flowing into the reservoir 20 can be treated with a softening device or with a reverse osmosis filter 23 and/or analyzed by a sensor 24 to detect the conductivity, pH or other chemical or physical parameters.

Preferably, the reservoir 20 is provided with a level sensor 20a.

The water from the reservoir is pumped to a mixing unit 30, by means of at least a first pump 25. The pump 25 is preferably driven by an electric motor with adjustable speed (not illustrated in the figure).

A flow meter 26 which, preferably, also performs the function of liter counter, is arranged downstream of the pump 25.

The apparatus also comprises pipes that place the drums F or the containers C of the additive product/products in communication with the mixing unit 30. Preferably, the apparatus also comprises level sensors 27 to be arranged in said drums/containers.

In the variant illustrated, the mixing unit 30 comprises at least a second pump 31 that collects the additive product from the drum/container and sends it to a mixing chamber 32. Said mixing chamber includes a static mixer 32a or similar devices.

Where the apparatus is designed to use several different additives, alternatively or mixed together, a single pump 31 in communication with several drums/containers, or a dedicated pump for each of them, can be provided.

In both cases, a shut-off valve 28 or, if necessary, a regulating valve, is provided upstream of the pump 31 to regulate the flow rate of additive product sent to the mixing chamber 32.

Moreover, a flow meter 29, if necessary operating as liter counter, is provided upstream or downstream of the pump 31.

A sensor 33 for measuring the concentration of the additive in the water is preferably provided downstream of the mixing chamber 32. If necessary, a further sensor 34 for chemical or physical analysis of the water (pH, conductivity, etc.) can also be installed.

According to the invention, the apparatus further comprises a control unit 40 in communication with the various components including the pumps, the sensors, the meters and the valves.

The control unit 40 is also connected to at least one user interface 41, for example a touch screen installed on the body 10 of the apparatus, by means of which an operator can control the apparatus and set the operating parameters thereof.

Said user interface 41 can, if necessary, be integrated in an external device, a smartphone, a tablet or a computer, connected to the control unit 40 via a dedicated network (wired or wireless) or via the Internet.

As mentioned above, the control unit 40 performs all the control functions of the apparatus, such as control of the level and of filling of the water reservoir 20, regulation of the first pump 25 and of the second pump 31 to obtain the end product with the required concentration of additive product and control of the valves 27 to regulate the flow of the additive product toward the mixing unit. The control unit 40, in particular, can analyze the effective concentration value downstream of the mixing chamber 32 and, if this differs from the nominal value required, can regulate the first or the second pump, or both, accordingly.

The control unit 40 can also detect the level of the additive product in the drums/containers and when this drops below a given threshold emit a warning signal for its replacement.

The cutting fluid product prepared can be dispensed directly in the vicinity of the apparatus, for example by means of a gun 51 or can be conveyed from the mixing unit 32 directly into the reservoirs or collection tanks 70 of one or more machine tools via pipes 52 and respective valves 53.

According to a preferred variant of the invention, the control unit 40 is programmed to interface with sensors mounted on the machine tool.

Said sensors can already be present on the machine tool or can be part of the apparatus according to the invention. More in detail, said sensors are a sensor for measuring the level 71 of the cutting fluid product in the reservoir 70 and a sensor for measuring the concentration 72 of the additive product.

The control unit 40 detects the data from said sensors and programs a top-up operation when the level in the reservoir 70 is below a given threshold or when the concentration differs by more than a maximum range from the optimal one established for the type of machine tool.

If necessary, the need to top up the cutting fluid product can only be indicated, while preparation and dispensing of the product to the machine can be controlled by an operator, for example via the user interface 41 or via a remote control positioned in the vicinity of the machine.

As explained previously, the control unit 40 is configured to calculate the concentration of the product to be prepared which, following top-up, allows the final concentration value of the product in the reservoir 70 of the machine to be taken as close as possible to the optimal value.

Figure 6:
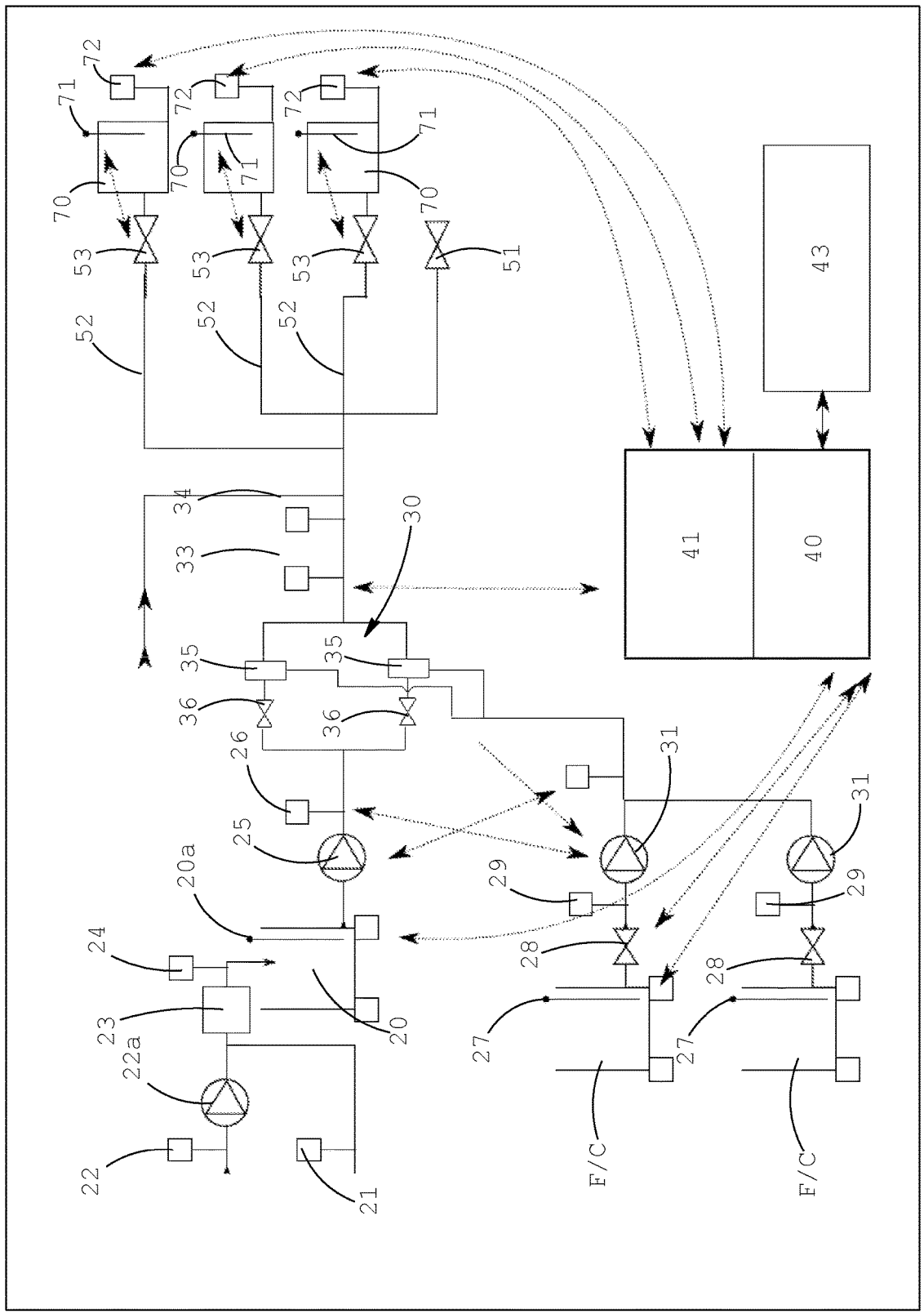
FIG. 6 is a schematic representation of the components of the apparatus according to another variant of the invention.

FIG. 6 schematically illustrates the apparatus according to an alternative variant of the present invention.

With respect to the previously described variant, the main difference regards the mixing unit 30 which, in this case, comprises one or more m mixing/dosing devices 35 of volumetric/proportional or Venturi effect type.

In the case in which only one mixing/dosing device 35 is provided, this can preferably be regulated to vary the concentration of the additive product. The regulation can take place with an automatic system managed by the control unit 40 or with a manual control.

In the case in which there are two or more mixing/dosing devices 35, as in the example of the figure, they can be of adjustable type but, nonetheless, are preferably used with a calibration preset at a certain concentration, different from that of the other mixing/dosing devices of the apparatus.

To prepare an amount of cutting fluid product with a different concentration to those set in the single mixing/dosing devices, the control unit 40 is programmed to calculate two or more respective partial amounts of product at the different concentrations of the single mixing/dosing devices 35 which, once mixed, have an average concentration equivalent to the one required.

To this end, shut-off valves 36 are provided on the water inlets from the various mixing/dosing devices 35 for their activation or deactivation. The valves 36 are required in particular when a single first pump 25 is provided to pump the water from the reservoir 20.

Where the apparatus provides one pump 25 for each mixing/dosing device 35, these can also operate simultaneously, as it is possible to regulate the respective water flow rates or activation times.

The apparatus, in this version, may or may not be equipped with the sensor 33 for measuring the concentration delivered from the mixing unit 30. In the case in which said sensor is provided, the control unit 40 can detect and signal abnormalities in the concentration of the product being prepared and, if necessary, correct the concentration by managing activation and exclusion of the various mixing/dosing devices 35.

In the case in which the apparatus is configured to interface with the sensors 71, 72 in the reservoirs 70 of the machine tools, the control unit 40 can operate in a manner similar to the one described previously, namely calculate the concentration required by the product to be topped up in order to obtain a final concentration in the reservoir 70 that is close to the optimal predetermined concentration.

In this variant, the flow meters 29 on the pipes for collection of the additive product from drums F or containers C are also optional, as the mixing/dosing device operates with a substantially fixed concentration.

In both the variants described, the data collected by the various sensors, both in the apparatus and those in the reservoirs of the machine, can be collected in a computing system 43, for example of cloud type, for example to monitor consumptions of additive products and manage supplies more rationally.

The invention has been described by way of non-limiting illustration, according to some preferred embodiments. Those skilled in the art can find many other embodiments and variants, all falling within the scope of protection of the appended claims.

The invention claimed is:

1. An apparatus (1) for preparing and dispensing a lubricant and coolant liquid product of the type used in machine tools comprising a mixture of water and at least one additive product, the apparatus comprising:
   a) a storage reservoir (20) of water suppliable from a water source;
   b) a mixing unit (30), in communication with said reservoir (20) and with the at least one container (F, C) of the additive product used to prepare the lubricant and coolant liquid product, configured to mix the water and the additive product in a predetermined concentration;
   c) first pumping means (25) adapted to pump the water from the reservoir toward the mixing unit (30);
   d) a control unit (40) for controlling at least the first pumping means; and
   e) a dispensing circuit (51, 52) for dispensing the lubricant and coolant liquid product obtained in the mixing unit (30);
   the apparatus further comprising a body (10) with a base (11) that defines a support surface (11a) adapted to accommodate said at least one container (F, C) of the additive product, said base comprising at least one collection tank (11b) above which said container can be positioned, and a containing structure (12) that encloses one, several or all the aforesaid components (a-e).

2. The apparatus according to claim 1, comprising at least one flow meter (26), connected to the control unit (40), positioned on the water inlet of the mixing unit (30).

3. The apparatus according to claim 2, wherein the mixing unit (30) comprises second pumping means (31), adapted to collect the additive product from the container and send the additive product toward a mixing chamber (32), and, if necessary, a further flow meter (29), both connected to the control unit.

4. The apparatus according to claim 3, wherein the control unit (40) is configured to control the first pumping means (25) and the second pumping means (31) to regulate the flow rate of the water and of the at least one additive product to obtain a lubricant and coolant liquid product with a predetermined concentration of the additive product.

5. The apparatus according to claim 1, wherein the mixing unit (30) comprises at least one mixing/dosing device (35) of volumetric or Venturi effect type.

6. The apparatus according to claim 5, wherein the mixing unit (30) comprises at least two mixing/dosing devices (35) to be placed in communication with the at least one container (F, C) of the additive product and regulated to obtain, individually, a lubricant and coolant liquid product with a different concentration of additive product.

7. The apparatus according to claim 6, comprising at least one valve (36) positioned on the water inlet of each mixing/dosing device, said valve (36) being controlled by the control unit.

8. The apparatus according to claim 1, comprising a sensor (33) for measuring the concentration of the at least one additive in the lubricant and coolant liquid product, said sensor (33) being installed downstream of the mixing unit (30) and being connected to the control unit (40).

9. The apparatus according to claim 1, wherein the dispensing circuit comprises at least one pipe (52) for conveying the lubricant and coolant liquid product into a reservoir (70) of a machine tool and wherein the apparatus comprises at least:
   a sensor (71) for measuring the level of the lubricant and coolant liquid product in the reservoir (70) of the machine tool;
   a sensor (72) for measuring the concentration of the at least one additive in the lubricant and coolant liquid product contained in said reservoir (70);
   said sensors being connected to the control unit (40), the control unit being configured to calculate the amount and the correct concentration of the product to be prepared in the mixing unit to take the liquid in the reservoir of the machine tool to a predetermined concentration.

10. The apparatus according to claim 1, wherein the base (11) and the containing structure (12) are separate and can be stably coupled.

11. The apparatus according to claim 1, wherein the containing structure (12) comprises a lower body (12b) in which the reservoir (20) is obtained and an upper body (12a) that encloses at least the other components (b-e) of the apparatus.

12. The apparatus according to claim 1, wherein the base (11) comprises two or more collection tanks placed side by side to form a single support surface for one or more containers (F, C) of the additive product.

13. The apparatus according to claim 2, wherein the mixing unit (30) comprises at least one mixing/dosing device (35) of volumetric or Venturi effect type.

14. The apparatus according to claim 2, comprising a sensor (33) for measuring the concentration of the at least one additive in the lubricant and coolant liquid product, said sensor (33) being installed downstream of the mixing unit (30) and being connected to the control unit (40).

15. The apparatus according to claim 3, comprising a sensor (33) for measuring the concentration of the at least one additive in the lubricant and coolant liquid product, said sensor (33) being installed downstream of the mixing unit (30) and being connected to the control unit (40).

16. The apparatus according to claim 4, comprising a sensor (33) for measuring the concentration of the at least one additive in the lubricant and coolant liquid product, said sensor (33) being installed downstream of the mixing unit (30) and being connected to the control unit (40).

17. The apparatus according to claim 5, comprising a sensor (33) for measuring the concentration of the at least one additive in the lubricant and coolant liquid product, said sensor (33) being installed downstream of the mixing unit (30) and being connected to the control unit (40).

18. The apparatus according to claim 6, comprising a sensor (33) for measuring the concentration of the at least one additive in the lubricant and coolant liquid product, said sensor (33) being installed downstream of the mixing unit (30) and being connected to the control unit (40).

19. The apparatus according to claim 7, comprising a sensor (33) for measuring the concentration of the at least one additive in the lubricant and coolant liquid product, said sensor (33) being installed downstream of the mixing unit (30) and being connected to the control unit (40).

20. The apparatus according to claim 2, wherein the dispensing circuit comprises at least one pipe (52) for conveying the lubricant and coolant liquid product into a reservoir (70) of a machine tool and wherein the apparatus comprises at least:
- a sensor (71) for measuring the level of the lubricant and coolant liquid product in the reservoir (70) of the machine tool;
- a sensor (72) for measuring the concentration of the at least one additive in the lubricant and coolant liquid product contained in said reservoir (70);
- said sensors being connected to the control unit (40), the control unit being configured to calculate the amount and the correct concentration of the product to be prepared in the mixing unit to take the liquid in the reservoir of the machine tool to a predetermined concentration.

* * * * *